United States Patent [19]

Washington

[11] Patent Number: 4,944,639
[45] Date of Patent: Jul. 31, 1990

[54] THREAD CUTTING DEVICE

[75] Inventor: Bruce A. Washington, Twinsburg, Ohio

[73] Assignee: Teledyne Industries, Inc., Los Angeles, Calif.

[21] Appl. No.: 212,074

[22] Filed: Jun. 24, 1988

Related U.S. Application Data

[62] Division of Ser. No. 847,728, Apr. 3, 1986, abandoned.

[51] Int. Cl.⁵ .................................................. B23G 1/22
[52] U.S. Cl. .................................... 408/176; 10/96 T; 408/177
[58] Field of Search ............. 408/22, 73, 74, 174–176, 408/216, 221, 177; 10/111, 120, 120.5 R, 96 R, 96 T, 136 R, 136 TS; 407/113, 120

[56] References Cited

U.S. PATENT DOCUMENTS

| | | | |
|---|---|---|---|
| 1,647,037 | 10/1927 | Duchesne ............................... | 10/120 |
| 1,844,419 | 2/1932 | Borden ............................. | 10/120.5 R |
| 1,852,186 | 4/1932 | Nonneman ..................... | 10/120.5 R |
| 1,936,112 | 11/1933 | Jardine ............................. | 10/120.5 R |
| 2,940,093 | 6/1960 | Pealer ............................. | 10/120.5 R |
| 3,118,666 | 6/1965 | Brown, Sr. et al. ................. | 10/96 R |
| 3,165,768 | 1/1965 | Herbkersman ................. | 10/120.5 R |
| 3,429,206 | 2/1969 | Quackenbush ............... | 10/136 R X |
| 3,597,782 | 8/1971 | Quackenbush ............... | 10/136 R X |
| 3,837,240 | 9/1974 | Mundy ................................. | 407/120 |
| 3,864,774 | 2/1975 | Fohl .................................. | 10/96 T X |

FOREIGN PATENT DOCUMENTS

521085  9/1976  U.S.S.R. .............................. 408/221

*Primary Examiner*—Z. R. Bilinsky
*Attorney, Agent, or Firm*—Nies, Kurz, Bergert & Tamburro

[57] ABSTRACT

A thread forming method and apparatus particularly suited for cutting tapered threads on round stock. The apparatus power feeds and rotates retreating die elements and includes mechanisms for quickly extending and retracting the die elements at the start and end of each threading cycle to achieve high production rates. The die elements include a face cutting edge which efficiently removes excess stock ideally in a single pass over the workpiece.

5 Claims, 6 Drawing Sheets

THREAD CUTTING DEVICE

This application is a division of application Ser. No. 847,728, filed Apr. 3, 1986, now abandoned.

BACKGROUND OF THE INVENTION

The invention relates to methods and apparatus for forming threads on a workpiece and, in particular, to such methods and apparatus for cutting tapered threads on bar, pipe, or like stock.

In general, prior art power-operated retreating die thread cutting equipment has been relatively complex, expensive to build, slow in operation, and inefficient in power consumption. In many instances, prior devices have not been suitable for use in cutting tapered threads on reinforcing bar, since such devices require rotation and/or axial feeding of the workpiece. This requisite movement of a workpiece can be impractical in applications such as reinforcing bar threading because of the relatively long lengths and mass of the workpieces being processed.

U.S. Pat. No. 2,054,028 to Benninghoff discloses a power-operated machine for cutting tapered threads on pipe. The machine incorporates a retreating die mechanism which is relatively complex. U.S. Pat. No. 3,812,548 to Theuerkaue shows a machine for cutting tapered threads on a pipe which has a threading head driven in rotation in timed relation to the axial feed rate of a workpiece. U.S. Pat. No. 3,864,774 to Fohl discloses apparatus for cutting tapered pipe threads which employs a scroll plate or control disc to control die retreating movement U.S. Pat. No. 1,116,838 to Oster et al. discloses thread cutting apparatus in which die retreating action is effected by interengaged, axially arranged screw elements. U.S. Pat. No. 4,526,496 to Kies et al. discloses a threading head for cutting tapered threads on a reinforcing bar. U.S. Pat. No. 4,282,618 to Wagner discloses a die for cutting tapered threads on reinforcing bars for concrete, the die being characterized by a relatively long total cutting edge length.

SUMMARY OF THE INVENTION

The invention provides a method and apparatus for high speed precision forming of tapered threads on a bar of workpiece body. The disclosed apparatus has a thread forming head that is positively driven both in rotation and in axial feed. Associated with the head is means for accurately retracting thread forming die elements during operation and means for quick extension and retraction of the die elements at the start and finish of such operation to achieve high production rates.

In the disclosed embodiment, the machine includes interengaged, threaded nut and screw members which rotate at different speeds to produce power feed action. The rotating head is turned in unison with one of the threaded members. Retracting action of the die or tool elements is produced by a control member rotatable on the head about an axis coincident with the axis of rotation of the head itself. A rotational drive to the control member includes a lost motion connection that produces, with mechanical simplicity, quick extension and retraction of the die elements upon reversal of the head rotation at the beginning and end of a thread forming cycle. The control member includes a constant rise angle cam surface to produce retreating action proportional to angular displacement, and thereby simplify construction of the machine and allow simple operator adjustment for working different bar diameters.

The die elements include a face cutting edge which advances ahead of other cutting edges that form the thread profile. The face cutting edge is arranged to remove the bulk of excess stock radially outwardly of the thread form. The disclosed die elements significantly lower horsepower requirements and size of machine components by permitting a major reduction of the total cutting edge length.

In accordance with an important aspect of this invention, where the thread pitch is numerically low and correspondingly high axial feed rates are required to cut threads at pitch, the die elements can be operated through two or more passes of the work, with the first pass at an axial feed rate less than that corresponding to the thread pitch and a finish pass at pitch. In the first pass, the majority of excess stock can be removed at a rate balancing tool life with high production, and in the last pass, a limited amount of material is removed for good finish and moderate tool loading.

The disclosed apparatus and thread cutting dies are particularly suited for cutting tapered threads on reinforcing bars. Such bars, formed end-to-end with threaded couplings, are used in vertical concrete columns of multistory buildings.

DESCRIPTION OF THE PREFERRED EMBODIMENT

Figure 1:
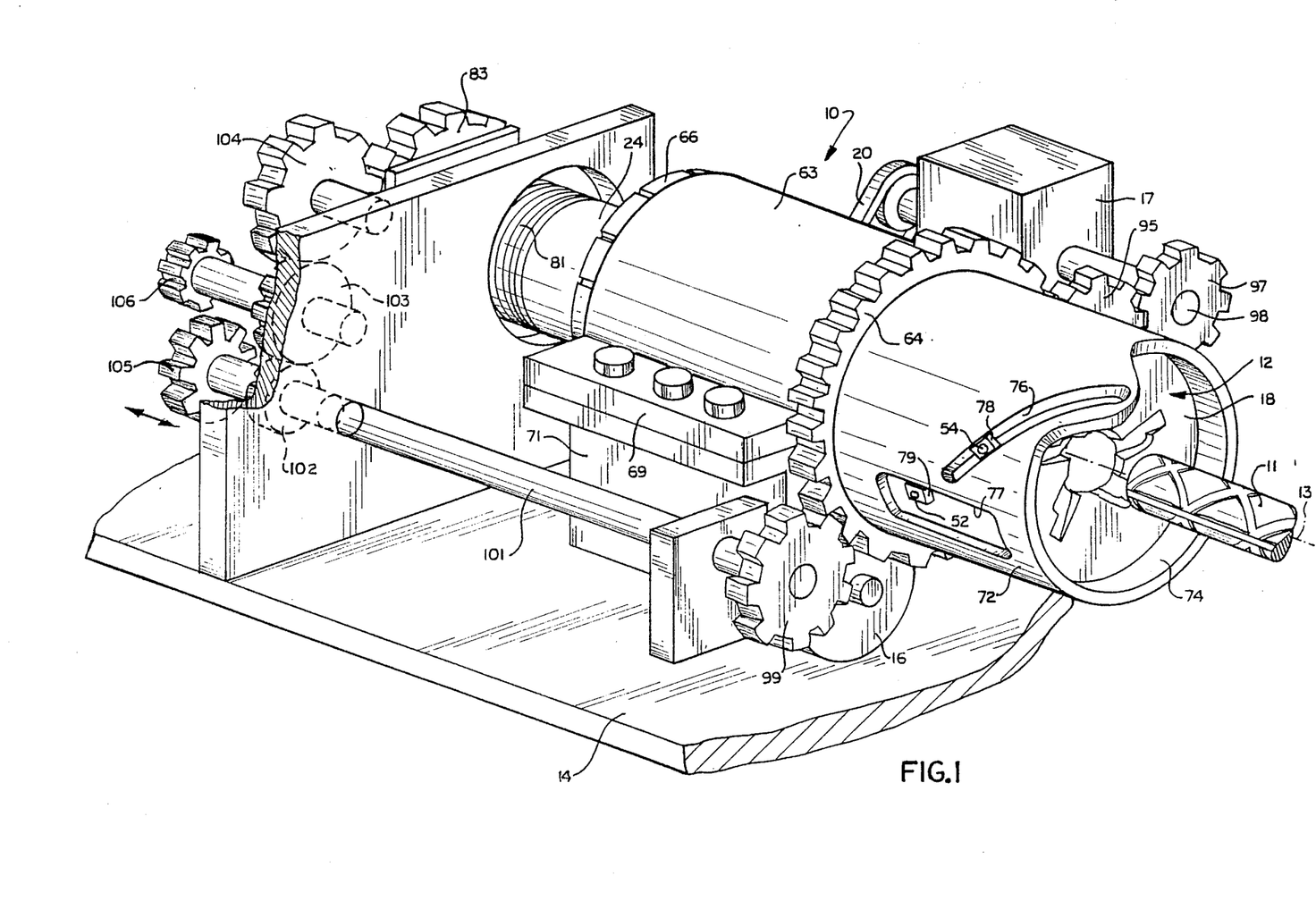
FIG. 1 is a schematic, perspective view of a thread cutting apparatus constructed in accordance with the present invention.

Apparatus 10 is provided for forming cut threads on a bar or other workpiece body 11. The apparatus or machine 10 includes a rotary thread cutting head 12 which rotates about a longitudinal axis 13, with which the axis of the bar 11 is aligned. Various stationary elements of the apparatus 10 are fixed on a table frame indicated generally at 14. The cutting head 12 is both rotated and fed axially under power of a drive system including an electric motor 16 driving a multiple speed gear reducer 17 through a belt 20.

Figure 3:
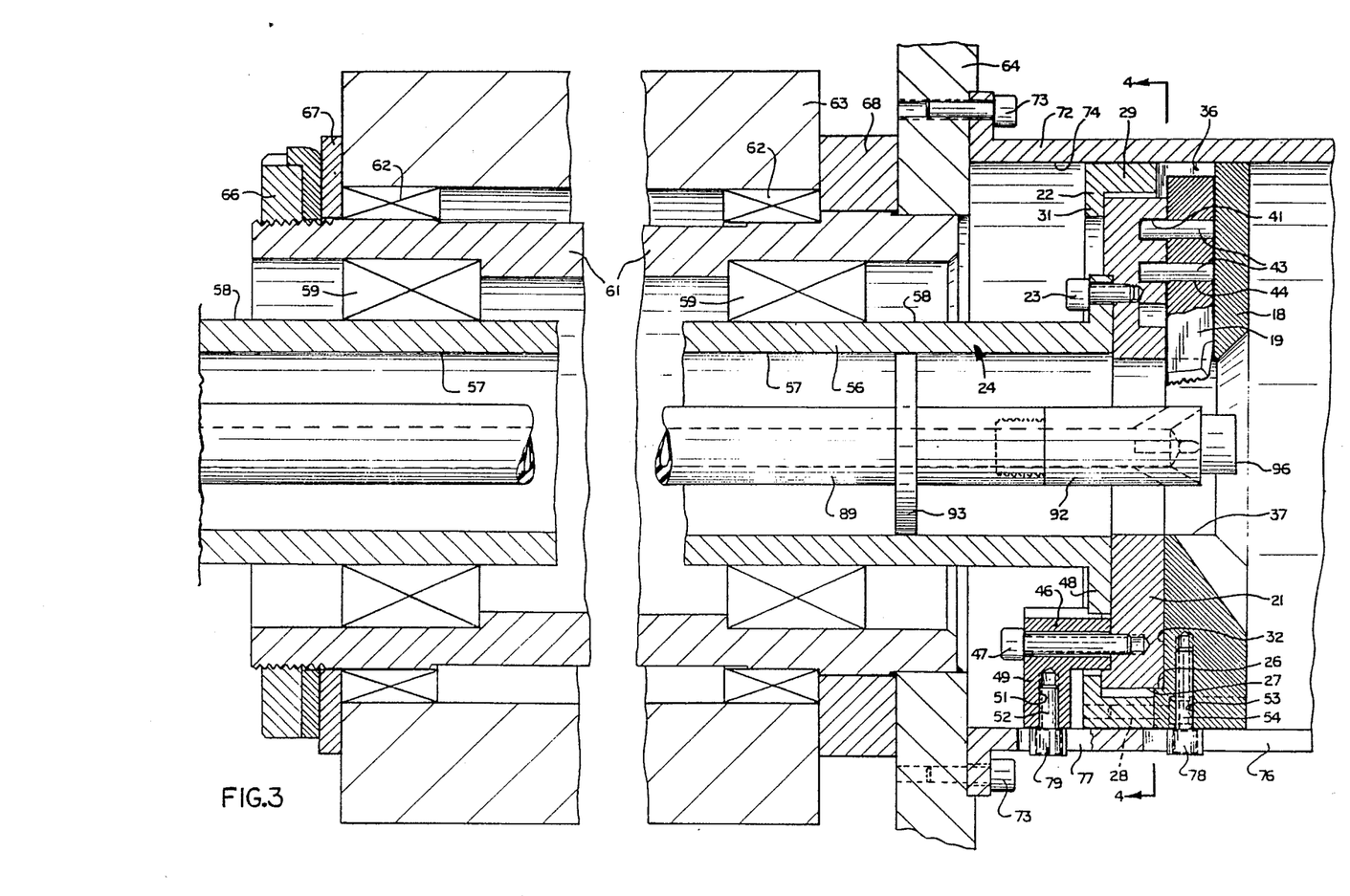
FIG. 3 is a fragmentary, cross-sectional view in an axial plane of a front portion of the apparatus illustrating details of a rotary cutting head and elements supporting it for rotation and axial reciprocation.

The rotary thread cutting head 12 includes a die holder plate 18, a plurality of thread cutting dies 19, a scroll plate 21, and a scroll ring clamp 22. The scroll plate 21 is fixed by bolts 23 on a forward end of a spindle or shaft 24. For reference purposes, the front end of the apparatus 10 is that associated with the rotary cutting head 12, and the orientations and directions of movement of various elements are explained with regard to this convention. A rear face of the die holder plate 18 includes a shallow counterbore 26 which pilots over an outer, cylindrical surface 27 of the scroll plate 21. The die holder 18 is captured on the scroll plate 21 by the ring clamp 22 to which it is bolted by a plurality of screw fasteners 28. The ring clamp 22 is an annular element having a cylindrical main body portion 29 and a radially inturned, peripheral flange 31. When the die holder plate 18 and ring clamp 22 are bolted together, the axial distance between the flange 31 and a radial face 32 of the counterbore 26 is sufficient to allow their respective surfaces to rotate relative to the scroll plate 21. The die holder 18, scroll plate 21, and scroll ring clamp 22 are all circular elements concentric with the axis 13.

Figure 4:
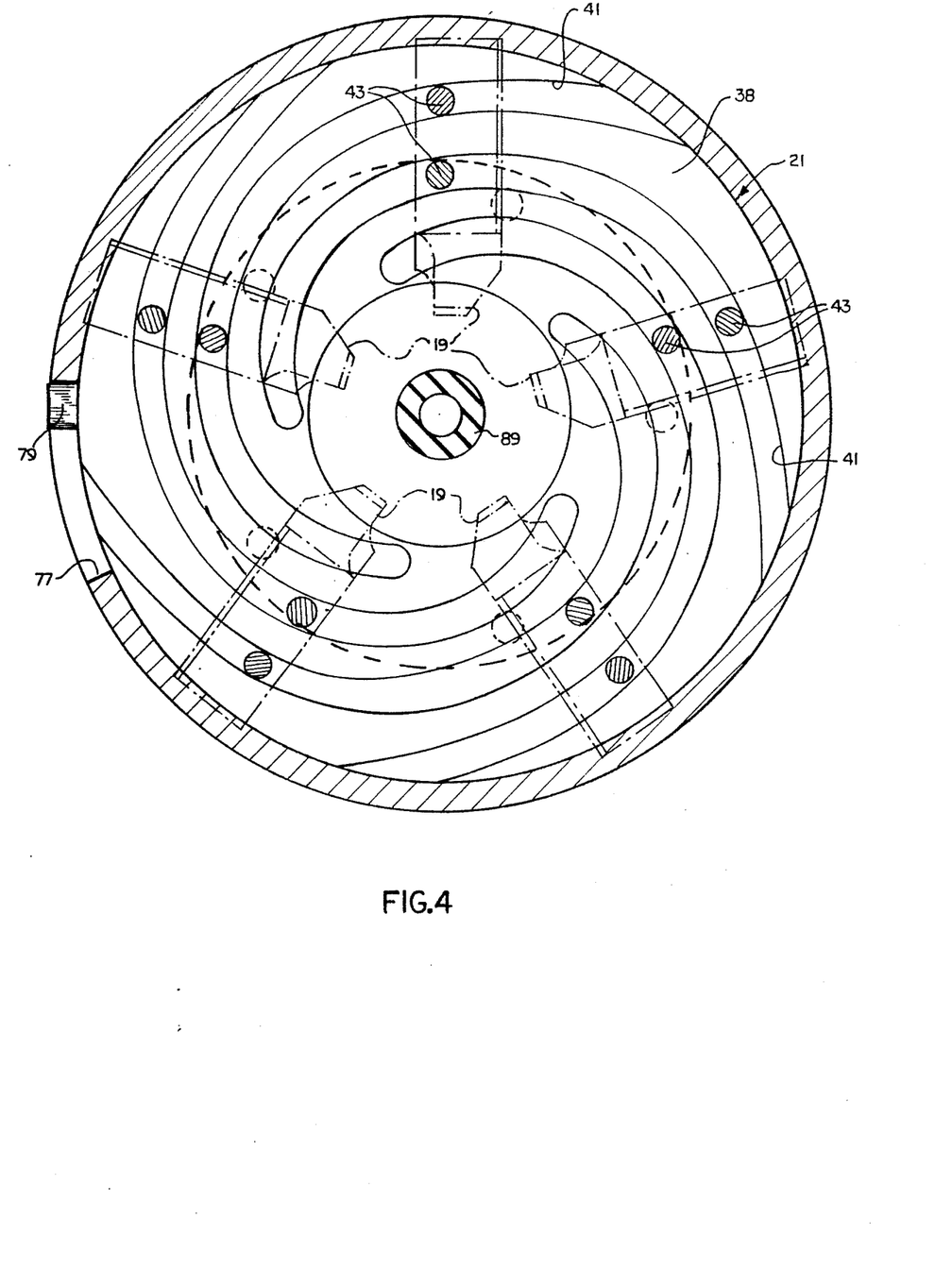
FIG. 4 is a fragmentary, cross-sectional view taken in a plane transverse to the axis of the apparatus indicated in lines 4—4 of FIG. 3 of the cutting head.
Figure 5:
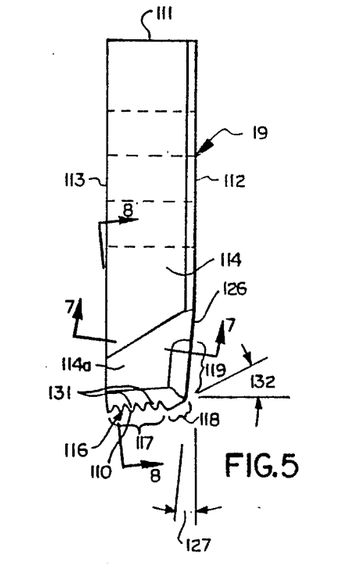
FIG. 5 is a side elevational view of a thread cutting die constructed in accordance with the invention and carried in the rotary head of FIGS. 3 and 4.

The die holder plate 18 has a plurality of radially extending slots 36 formed in its rear face. These slots 36, which in the illustrated case are equally angularly spaced and are five in number, extend from a central bore 37 of the die holder plate 18 radially outwardly to the outer periphery of the plate. Each slot 36 is rectangular in cross section, as viewed in its respective radial direction, and is sized for a close sliding fit with a respective die 19.

On its forward face 38, the scroll plate 21 is formed with five scroll cam grooves 41 corresponding to the set of five dies 19. One or more dowel pins 43 press-fitted into respective holes 44 in each one of the dies 19 are received in these scroll cam grooves 41. The dowel pins 43 are arranged to slide along the surfaces of their respective cam grooves 41. A scroll guide bracket 46 is secured to a rear face of the scroll plate 21 by bolts 47. The scroll guide bracket 46 extends axially and arcuately, with respect to the longitudinal axis 13, with clearance through a radial gap between the ring clamp flange 31 and a flange 48 of the spindle shaft 24. A radially extending flange 49 of the bracket 46 is provided with a series of arcuately spaced, radially extending, threaded holes 51 to selectively receive the shank of a threaded shoulder bolt 52. Only one of these holes 51 is seen in FIG. 3, and others are located above and below the plane of FIG. 3, each with a radial orientation. The die holder plate 18 is similarly provided with a radial threaded hole 53 and receives the radially extending shoulder bolt 54.

The spindle 24 comprises an elongated, cylindrical, tubular body 56 having an internal cylindrical bore 57 and an external cylindrical surface 58. The cylindrical shaft surfaces 58 is supported for rotation and axial movement along the axis 13 by one or more cylindrical sleeve bearings 59 press-fitted in opposite ends of a round, tubular drive shaft 61 concentrically arranged around the shaft 24.

The drive shaft 61 is rotationally supported by sleeve bearings 62 encircling it adjacent its opposite ends and press-fitted into associated opposite ends of stationary housing 63. On its forward end, the drive shaft has fixed to it, as by welding, a bull or ring gear 64. At its rear end, the drive shaft is externally threaded and receives a nut 66 which is tightened towards the bull gear 64 to axially fix the drive shaft 61 in the stationary housing 63. Thrust bearings 67, 68 assembled on the drive shaft at opposite ends of the stationary housing 63 resist axial forces on the drive shaft 61. The stationary housing 63 is supported on the table 14 through radial flanges 69 on opposite sides of the housing and carried on associated uprights 71 fixed on the table. Only the side flange and uprights 68, 71 on the left are seen in FIG. 1, and it will be understood that a similar flange and upright 69, 71 are provided on the diametrally opposite side of the housing.

A cylindrical tube or shell 72 is fixed on a front face of the bull gear 64 by a plurality of threaded bolts 73. The shell is concentric with the axis 13 and has an inside cylindrical surface 74 sized to provide a clearance fit for the radially outer surfaces of the die holder plate 18 and scroll ring clamp 22. The wall of the cylindrical shell 72 is formed with a helically oriented cam slot 76 of moderate width and an axial cam slot 77 of relatively wide width in the circumferential direction of the shell. The shoulder bolts 54, 52 support respective cam follower blocks 78, 79 in respective ones of the cam slots 76, 77.

Figure 2:
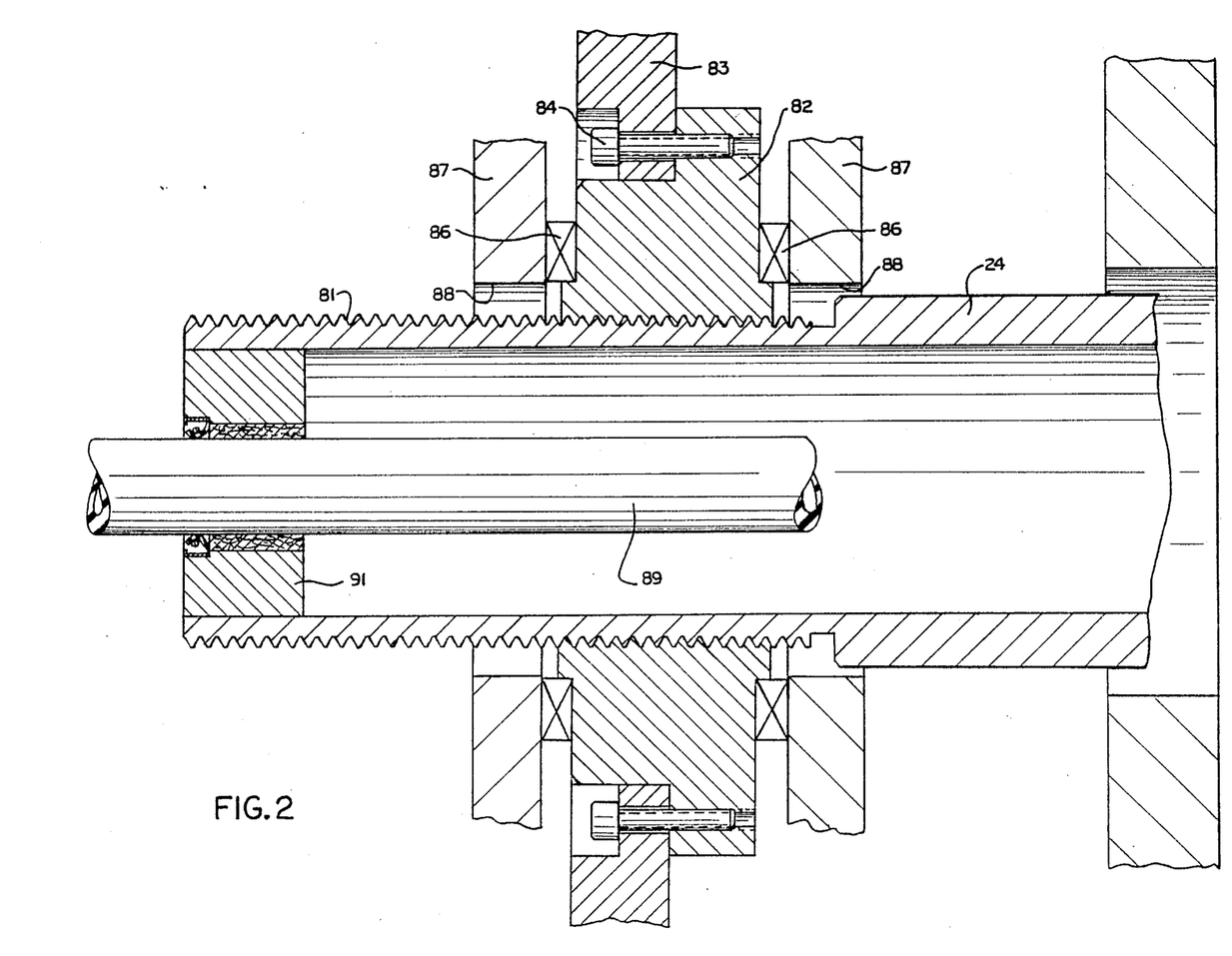
FIG. 2 is a fragmentary, cross-sectional view in an axial plane of a rear portion of the apparatus illustrating details of a differential speed nut and screw feed.

With particular reference to FIG. 2, a rear end or screw portion of the spindle shaft 24 is externally threaded with trapezoidal screw threads 81. A lead screw nut 82 has internal threads complementary to those of the spindle shaft 24 and is in threaded engagement therewith. A ring gear 83 is fixed to the periphery of the lead screw nut 82 by screws 84. Both the nut 82 and ring gear 83 are concentric with the axis 13. The nut 82 and gear 83 are axially fixed with respect to the frame 14 by opposed thrust bearings 86 and frame brackets 87 fixed to the frame. The frame brackets 87 are provided with cylindircal clearance bores 88 for assembly therethrough of the spindle 24.

Concentric with the axis 13 and extending through the spindle shaft bore 57 is a fluid delivery tube 89. The delivery tube 89 extends through an apertured plug 91 at the rear of the spindle shaft 24 axially along the length of the spindle to the area of the cutter head 12. At its forward end, the fluid delivery tube 89 includes a replaceable end nozzle 92 which is threaded into it. A conventional pump (not shown) pumps fluid to the dies 19 during operation of the apparatus 10 for purposes of lubrication and cooling through the delivery tube 89 and nozzle 92. Adjacent its forward end, the fluid delivery tube 89 includes an annular washerlike shoulder 93 which slips in the spindle bore 57 to support the delivery tube at this end. At its rearward end (not shown) the fluid delivery tube 89 is coupled by a suitable hose to the fluid delivery pump. Additionally, this rearward end of the fluid delivery tube 89 is clamped in a suitable bracket to axially fix the delivery tube on the frame 14 such that an end face 96 of the end nozzle 92 is in a position to locate the adjacent end of the workpiece 11 when it is abutted by the same in preparation for a work cycle.

A pinion gear 97 fixed to an output shaft 98 from the gear reducer 17 drives the bull gear 64 through an idler gear 95 upon energization of the motor 16. The bull gear 64 on its side opposite the pinion 97 drives a pickoff gear 99 fixed to a differential drive shaft 101 extending parallel to the axis 13. At its rear end, the differential drive shaft 101 is fixed with a gear 102 that drives an idler gear 103, which in turn drives another gear 104 meshed with the ring gear 83 of the lead screw nut 82. It is thus seen that rotation of the motor 16 causes rotation of the lead screw nut 82 through the pickoff gear 99 and gear train represented by the gears 102–104.

The cylindrical shell 72, which is driven directly by the bull gear 64, power drives the cutting head 12 in rotation through the cam follower blocks 78, 79 associated with its cam slots 76, 77. A close fit between the follower block 78 and the sides of the associated slot 76 assures that angular movement of the cylindrical shell 72 produces a corresponding immediate angular displacement of the die holder plate 18.

The circumferential width of the other slot 77, being substantially greater than the circumferential extent of the cam follower block 79, provides a lost motion connection between the cylindrical shell 72 and the scroll plate 21. Thus, when the cylindrical shell 72 changes its direction of rotation, there is an initial lag in the rotation of the scroll plate 21 corresponding to the difference in the circumferential width of the slot 77 and block 79.

Engagement of the scroll cam tracks or grooves 41 and the associated dowel pins 43 produces or controls radial movement of the dies 19 in the die holder plate slots 36 upon any relative rotation between the die holder plate 18 and scroll plate 21. The cam grooves 41 are arranged to produce a constant rise or radial movement of the dies 19 in direct linear proportion to the angular displacement between these plates 18, 21. The helical cam slot 76 in the cylindrical shell 72, for a given arrangement of the scroll cam grooves 41, controls the rate at which the dies 19 retract radially outwardly as they pass axially over the workpiece 11.

In operation of the apparatus 10, a workpiece 11 is moved into a work station directly in front of the rotary cutting head 12, with the end of the workpiece 11 abutted against the nozzle end face 96 and, in the case of a round bar or tube, with its axis coincident with the apparatus axis 13. The workpiece or bar 11 is held stationary in this position by a conventional vise, for example. The motor 16, under suitable manual or automatic controls, is started and rotation of the bull gear 64 commences. The cylindrical shell 72, fixed to the bull gear 64, rotates and drives the cutter head 12 in rotation by means of the cam follower blocks 78, 79. When cutting righthand threads, this rotation is clockwise when viewed axially from the rear to the front of the apparatus 10. As indicated above, while the scroll plate 21 is driven by the cylindrical shell 72, its rotation is delayed slightly by the lost motion connection between these members existing because of the circumferential clearance between the width of the slot 77 and circumferential width of the block 79. The delayed rotation of the scroll plate 21 results in relative rotation between it and the die holder plate 18, causing the dies 19 to quickly assume a starting position wherein they are collectively radially constricted to a relatively small diameter thread cutting position.

As previously explained, the lead screw nut 82 is caused to rotate by the drive shaft 101 and gear train 102–104. The spindle shaft 24 is fed axially forwardly at a rate determined by the difference in its rotational speed from that of the nut 82. The rotational speed of the spindle shaft 24 is substantially equal to that of the bull gear 64 and cylindrical shell 72 which drives it through the cam follower block 78. The true rotational speed of the shaft 24 is that of the cylindrical shell 72 plus (in an algebraic sense) rotation between the shell and shaft imparted by the helical orientation of the cam slot 76. Axial motion of the shaft 24, developed by the differential speed of the nut 82 and shaft, causes the cutter head 12 carried on the forward end of the shaft to be positively driven axially towards the workpiece 11. Thus, the dies 19 of the cutter head 12 are positively power driven both axially and in rotation.

Axial movement of the cutter head 12 developed by relative rotation between the nut 82 and spindle shaft 24 causes the cam follower 78 to move along the helical slot 76. The slot 76, working through the follower 78, causes angular displacement of the die holder plate 18 relative to the cylindrical shell 72. This results in relative angular displacement between the die holder plate 18 and scroll plate 21, since the scroll plate cannot move angularly with respect to the cylindrical shell 72 once the associated cam follower block 79 has abutted a longitudinally extending side of the slot 77. As previously suggested, angular displacement between the die holder plate 18 and scroll plate 21 produces and controls die retracting action or radial outward movement of the dies 19 in their respective slots 36. The helical cam slot 76 has a configuration which, in cooperation with the configuration of the scroll plate cam grooves 41, produces a tapered thread on the workpiece. Where the workpiece 11 is a steel reinforcing bar for concrete, for example, a typical taper angle is six degrees.

With the apparatus or machine 10 under automatic or semiautomatic control, the motor 16 operates until the spindle shaft 24 moves a predetermined distance, causing the cutters or dies 19 to progressively cut along the end of the workpiece 11 a corresponding axial length. A limit switch (not shown) senses this predetermined distance and reverses the motor 16. Initial reverse angular motion of the cylindrical shell 72 causes immediate limited relative rotation between the die holder plate 18 and scroll plate 21 because of the lost motion connection of the cam follower block 79 and slot 77 and the direct positive angular connection between the cam follower block 78 and its slot 76. This relative rotation produces quick opening of the dies 19 to thereafter permit continued reverse rotation of the motor to axially retract the spindle 24 and cutter head 12 to their starting position. A second limit switch (not shown) detects arrival at the starting position and discontinues operation of the motor 16 until the workpiece 11 is removed and replaced with a new workpiece.

The cutting head 12 is selectively adjusted to thread bars 11 of different diameters by changing the position of the shoulder bolt 52 and cam follower block 79 on the scroll guide 46. As previously disclosed, several threaded holes 51 with a radial orientation with respect to the axis 13 are angularly spaced on the arcuate outer surface of the scroll guide 46 for this purpose. The constant rise angle of the scroll plate cam grooves 41 allows the simple change in position of the bolt 52 and block 79 on the scroll guide 46 to be essentially all that is necessary in the way of adjustment to accommodate changes in bar diameter.

FIGS. 5 through 8 illustrate details of one form of a preferred die 19 for use in the apparatus 10 in forming tapered threads. The die 19 is provided in the form of a generally rectangular block or parallelopiped of suitable cutting material such as high speed tool steel. The die 19 includes a working end face 110, an opposite end face 111, a front face 112, a rear face 113, and side faces 114, 115. The various faces 112–114 are arranged to provide a die size which provides a sliding fit in an associated slot 36 in the die holder plate 18. The working end face 110 and adjacent area of the front face 112 include a cutting edge 116 having a thread profile section 117, a throat section 118, and a facing section 119. These edge sections 117–119 generally lie in a plane parallel to the plane of FIG. 5 and in assembly in the apparatus 10 parallel to the longitudinal axis 13 with the facing section edge 119 leading in the forward direction. Areas of the die 19 adjacent the cutting edge sections are undercut with local planar surfaces 121, 122 to provide rake angles 123, 124 of, for example, 15 degrees from the plane of a side face area 114$_a$.

The facing edge 119 (FIG. 6) lies along an intersection of an imaginary plane parallel to the side faces 114, 115 and the plane of a forward face area 126 which is skewed at a shallow angle 127 of, for example, five degrees (FIG. 5) to the rear with reference to the front face 112. As viewed in FIG. 5, the facing edge 119 consequently lies along a line which extends rearwardly with increasing proximity to the working end face 110. This edge 119 can have other attitudes, however, such as along a line parallel to the intersection of the planes of the front face 112 and side face 114.

Figure 6:
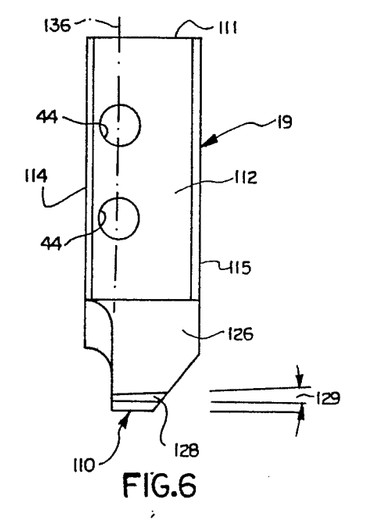
FIG. 6 is a front elevational view of the thread cutting die.
Figure 7:
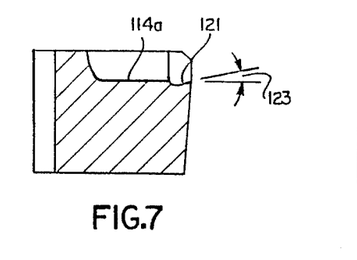
FIG. 7 is a fragmentary, cross-sectional view of the die taken in the plane of the line 7—7 indicated in FIG. 5.
Figure 8:
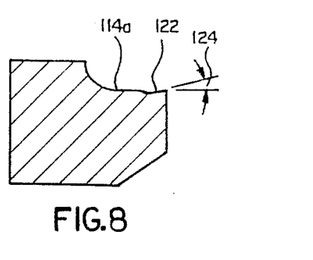
FIG. 8 is a fragmentary, cross-sectional view of the die taken in the plane 8—8 in FIG. 5.

The working end face 110 includes a relief plane 128 that is skewed a small anlge 129 of, for example, three degrees from a plane perpendicular to the side faces 114, 115 (FIG. 6). This plane 128 provides relief for the throat section edge 118. The edge section 117 has the outline in FIG. 5 of a thread profile, and includes at least three full teeth for developing a satisfactory thread finish on the workpiece. The individual teeth 131 on this profile section 117 have an included angle of 60 degrees. The teeth are arranged such that a line bisecting this 60-degree included angle is parallel to the front and rear faces 112 and 113, it being understood that when the die 19 is mounted in the die plate 18, these faces are perpendicular to the longitudinal axis or axis of rotation 13. The crests of the teeth 131 lie along a common imaginary line which corresponds to the taper angle of the thread to be formed on the workpiece 11, such as an angle of 6 degrees. The throat section edge 118 is formed at an angle 132 in the range of 15 to 20 degrees, for example, from a line perpendicular to the front and rear faces 112, 113.

Figure 9:
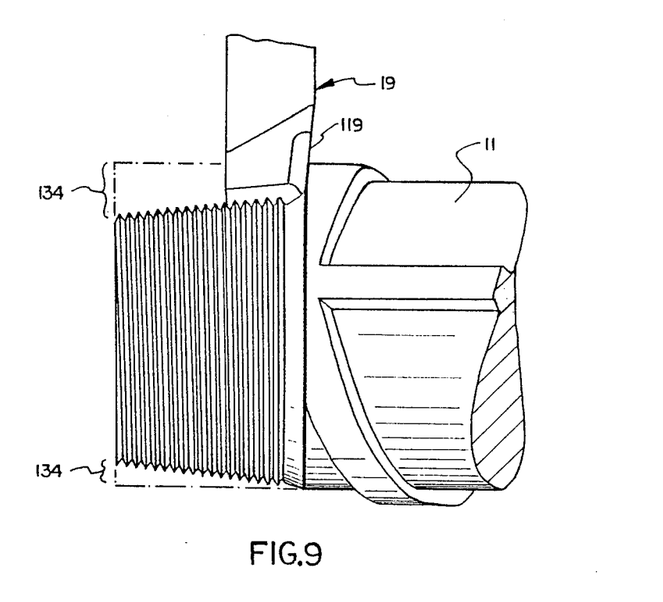
FIG. 9 is a fragmentary, elevational view of a bar on which tapered threads have been cut in accordance with the invention.

The total radial length of the throat edge 118 and facing edge 119 is preferably sufficiently long to extend radially fully across that portion 134 (FIG. 9) of the body of the workpiece radially outward of the crest of the minor diameter threads adjacent the end of the workpiece. The thread form or profile section 117 removes only a limited amount of material consisting primarily of that between the roots and crests of the thread being formed on the workpiece 11. Since the thread profile section 117 is doing a relatively limited amount of cutting and stock removal, only a relatively few teeth are required to achieve a good finish and still afford a long service life. It can be understood from inspection of FIG. 5 that the die 19 has a relatively short overall cutting edge length consisting of the total length of the profile section along each side of each tooth 131, the length of the throat section 118, and the length of the facing section 119. Therefore, the die requires a correspondingly small amount of horsepower to drive it. Consequently, the apparatus 10 consumes relatively low levels of power and can be designed to operate with relatively small components. As shown in FIG. 6, the axii of the cylindrical holes 44 lie on a common imaginary plane 136 which is parallel to the longitudinal direction of the body of the workpiece 19 and, ideally, is coincident with the plane of the cutting edge 116. With surfaces of the holes 44 and pins 43 received in them symmetrical with this plane 136, forces on the pins 43 developed by the scroll cam grooves 41 are directed generally in a radial direction towards the workpiece 11.

In one mode of thread cutting, the thread 12 carries the dies 19 at an axial feed rate, by appropriate selection of the gears 102–104, with reference to the rate of rotation of the head that is equal to the pitch of the thread form or teeth 131 on the dies and those being formed on the workpiece. In cases where the pitch of the thread is not relatively coarse, for example 8 pitch or higher (8 threads/inch), and a multiplicity of, for example, five dies work simultaneously, it is practical to use their face cutting edges 119 to remove stock at the axial feed rate equal to the thread pitch when such dies are constructed of conventional high-speed tool steel materials. Consequently, the apparatus 10 can form a threaded end on the workpiece in a single pass.

Where the threads to be formed are relatively coarse, e.g., less than 8 pitch, the die elements can be operated through two or more passes of the work, with the first pass at an axial feed rate less than that corresponding to the thread pitch and a finish pass at pitch. In the first pass, the majority of excess stock can be removed at a rate balancing tool life with high production, and in the last pass, a limited amount of material is removed for good finish and moderate tool loading. Different axial feed rates can be achieved, for example, by manually selecting a different gear set in the gear drive train. For one feed rate, as described, the gears 102 and 103 are meshed, and for another rate, gears 105 and 106 are meshed while the gears 102 and 103 are mutually disengaged. It will be understood that the gears 102, 105 are axially slidable and rotationally fixed on the shaft 101 and the gear 106 is fixed relative to the gear 103.

Figure 10:
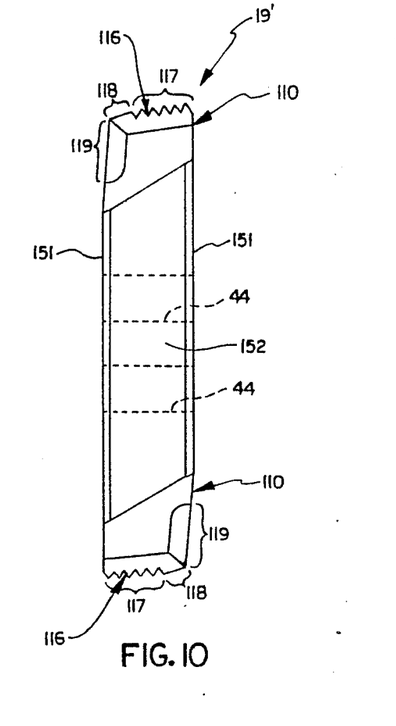
FIG. 10 is a side elevational view of a modified form of thread cutting die constructed in accordance with the invention.
Figure 11:
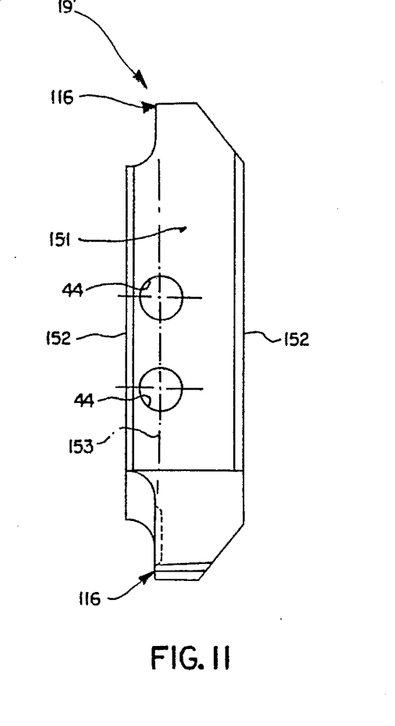
FIG. 11 is a front/rear elevational view of the thread cutting die of FIG. 10.

FIGS. 10 and 11 illustrate a double-ended thread cutting die 19'. Like the earlier-described die 19, the die 19' has the general form of a rectangular block or parallelopiped of suitable cutting material, such as high-speed tool steel. Opposite working end faces 110 of the die 19' are substantially identical to the working end face 110 of the die 19 illustrated in FIGS. 5–8 and corresponding areas are designated with identical numerals. Surfaces 151 alternately serve as front and rear faces corresponding to the front and rear faces 112, 113 of the die 19. Similarly, surfaces 152 correspond to the side faces 114, 115 of the die 19.

Cutting edge sections 117–119 of the cutting edge 116 at each end of the die 19' generally lie in a common imaginary plane 153 parallel to the plane of FIG. 10 and the longitudinal axis of the body of the die 19'. Ideally, this imaginary plane 153 extends through the axii of cylindrical bores or holes 44 so that the surfaces of these bores and pins 43 press-fitted in them are symmetrically arranged about the plane 153. With the surfaces of the holes 44 symmetrical with this plane 153, reaction forces between the pins 43 and scroll plate cam grooves 41 advantageously lie in a generally radial line with reference to the axis 13 of the apparatus 10 that passes through the cutting edge areas 117–119. As in the case of the die 19, the surfaces of the bores 44 have a predetermined spacing from the cutting edges 116 so that a precise radial position of the die 19' during retracting action is gauged by cooperation between the pins 43, supported in the holes 44, and scroll cam grooves 41.

The disclosed double-ended die 19' is assembled in the die holder plate 18, and operates in essentially the same manner as the die 19. After a first working end face 110 has served its useful life, the die 19' is removed from the holder plate 18, the pins 43 are pressed through the body of the die 19' to extend through the opposite face 151 and the die is reinserted into the holder plate 18, with the unused other working end 110 arranged to cut threads. By providing two working faces, the die 19' offers economies in manufacture and distribution. In the view of FIG. 11, it is seen that the die 19' is nonsymmetrical with respect to the plane 153. This construction assures that sufficient stock is provided behind the cutting edges 116 for their support while avoiding unnecessary stock in front of the cutting edges.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A machine for threading a body comprising a frame, a head for supporting a thread forming tool, means for supporting the head relative to the frame for rotation and feeding movement along the axis of such rotation, an interengaged screw and nut each rotatably supported on the frame, the screw and nut including means for feeding the head axially relative to the frame at a rate proportional to the difference in rotational speed between the screw and nut, power drive means on the frame for separately rotating the screw and nut at different speeds, and means to retract said tool radially at a rate proportional to the axial movement between said head and said frame.

2. A machine as set forth in claim 1, wherein said retreating means includes mutually cooperating elements rotatable relative to one another to produce retreating action of said tool.

3. A machine as set forth in claim 2, wherein said mutally cooperating elements are rotatable relative to one another about the axis of rotation of said head.

4. A machine as set forth in claim 3, wherein one of said cooperating elements is connected to said power drive means with a lost motion connection, said power drive means and cooperating elements including means to rapidly extend or retreat said tool in a radial direction upon a reversal of the rotary direction of said power drive means and a resulting shift of position of said lost motion connection.

5. A machine for threading a body comprising a frame, a rotary head mounted on the frame for rotation about an axis, a tool carried on the head for forming threads on the body as it rotates, tool retreating control means associated with the head and rotatable relative to the head about said axis, said control means including means for converting angular displacement between it and said head about said axis to radial retreating movement of said tool, power drive means for rotating said head about said axis on said frame selectively in opposite directions, and a lost motion connection means between said control means and said power drive means to allow said control means to lag said head in rotation at each directional shift in rotation of said power drive means whereby a relatively fast rate of radial movement of said tool is produced during the period of lost movement.

* * * * *